July 19, 1927.

F. T. SCHREIBER

MOVABLE SEAT

Filed Aug. 18, 1925

F. T. Schreiber Inventor

By C. A. Snow & Co.
Attorneys.

July 19, 1927.
F. T. SCHREIBER
1,636,078
MOVABLE SEAT
Filed Aug. 18, 1925
2 Sheets-Sheet 2
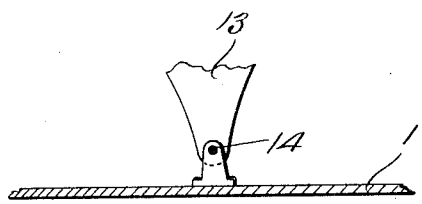
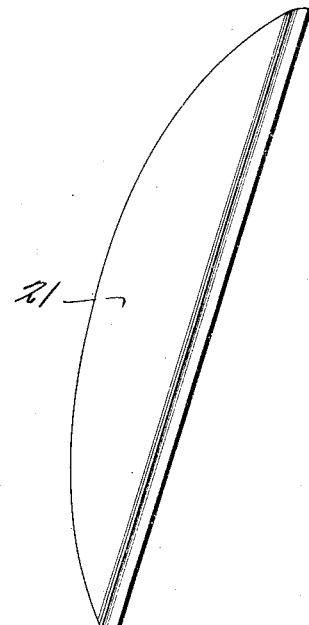
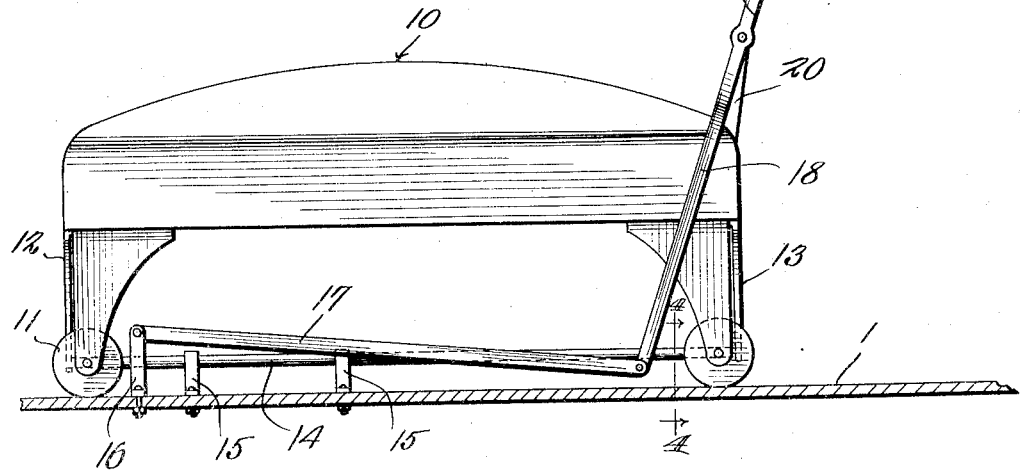
F. T. Schreiber
Inventor
By C A Snow & Co.
Attorneys.

Patented July 19, 1927.

1,636,078

UNITED STATES PATENT OFFICE.

FREDERICK T. SCHREIBER, OF OCALA, FLORIDA.

MOVABLE SEAT.

Application filed August 18, 1925. Serial No. 50,994.

This invention relates to movable seats and more particularly to seats of this character adapted to be used in automobiles.

The object of the invention is to so construct a seat of this character that a folding movement of the seat back will cause the seat to move forward and the raising of the back when in folded position will cause the seat to move rearward to initial position.

Another object of the invention is to construct a seat of this character which is simple and easily operated having few parts liable to get out of order or be broken.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 3 is a side elevation showing the seat with the back in raised opposite position and the seat in initial novel position ready for use, and Figure 4 is a detail transverse section taken on the line 4—4 of Fig. 3.

Figure 1:
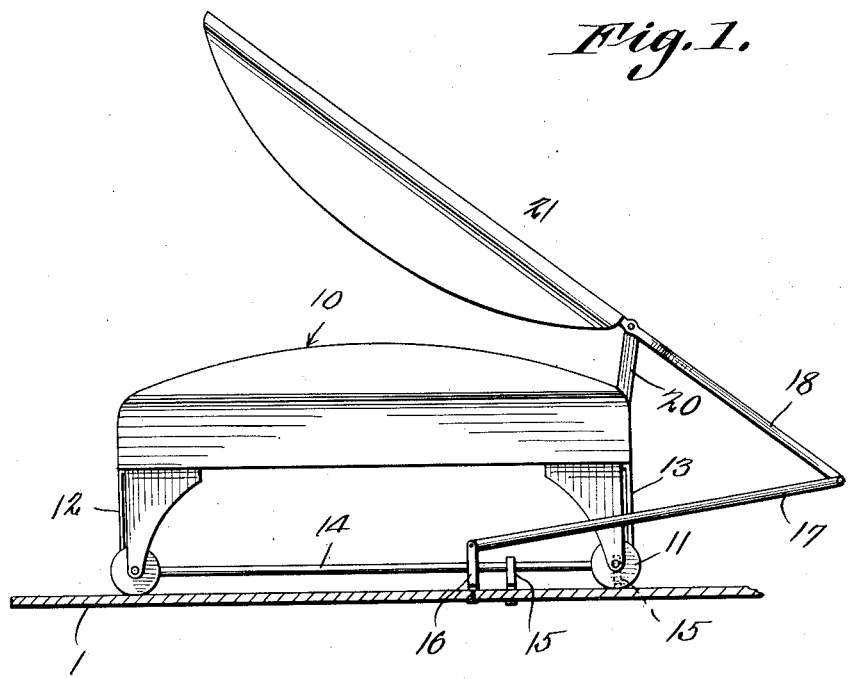
Figure 1 represents a side elevation of a seat constructed in accordance with this invention with the back folded and the seat in projected position.

In the embodiment illustrated, 1 represents the floor of the vehicle on which the seat constituting this invention is designed to travel, such seats being usually employed in sedans, coaches or other forms of automobiles.

While primarily intended for use in an automobile obviously this seat may be employed in buildings or any other place where it may be desirable to use it.

The seat 10 which may be of any desired construction either upholstered or not is equipped with four legs having rollers 11 adapted to move back and forth over the floor 1. Depending from the front and rear of seat 10 are two brackets 12 and 13 which are located midway the width of the seat and terminate above the floor. Supported in these brackets is a rod 14 which is mounted to slide in longitudinally spaced upstanding brackets 15 which are bolted or otherwise secured to the floor 1 and form guides for the rod and to hold the seat against transverse movement while permitting it to move longitudinally back and forth.

Figure 2:
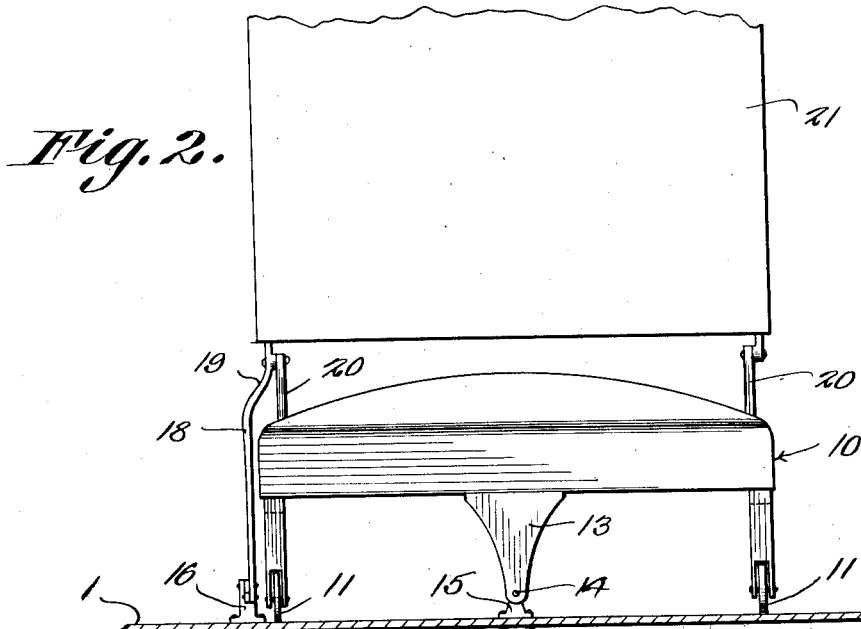
Figure 2 is a rear elevation of the seat with the back open and parts thereof broken off for convenience in illustration.

Another bracket 16 is bolted to the floor in advance of the brackets 15 and extends above the plane of the rod 14. Pivotally mounted at one end in the bracket 16 is a link or bar 17 the other end of which extends toward the rear of the seat and is pivotally connected with the lower end of a lever 18. This lever 18 has its upper end offset inwardly as shown at 19 in Fig. 2 and is fulcrumed to an upstanding post 20 one of which is arranged at each side of the back of the seat 10 and which supports the back 21 which is pivotally connected to the posts. The lever 19 is made integral or rigidly secured to the back 21 embodying an extension thereof so that when the body is raised or lowered the lever 18 will exert a pull or a push to move seat 10 either forwardly to the position shown in Fig. 1 when the back is folded down or rearwardly into the position shown in Fig. 3 when the back is raised into normal operative position.

It will thus be seen that the lowering or raising of the back 21 will operate to project or retract the seat 10 and when it is projected ample room will be afforded for entrance at the back of the seat, and to straighten up the back will retract the seat into normal position.

It will thus be seen that a seat constructed as herein shown and described may be easily and quickly moved out of the way for entrance or exit from a rear seat through a two door sedan or coach and is quickly restored into position when desired.

I claim:—

In a device of the class described, a seat, means for holding the seat positively for right-line backward and forward sliding movement, a lever, means for fulcruming the lever intermediate its ends on the seat, to define upper and lower portions in the lever, a back rest carried by the upper portion of the lever, a link pivoted at one end to the lower portion of the lever, and means for anchoring the other end of the link pivotally, and independently of the seat.

In testimony that I claim the foregoing as my own, I have hereto affixed my signature.

FREDERICK T. SCHREIBER.